United States Patent [19]

Lee, II et al.

[11] Patent Number: 4,804,468

[45] Date of Patent: Feb. 14, 1989

[54] SELF-RETAINING SMOOTH BORE INSERT

[75] Inventors: Leighton Lee, II, Guilford; Robert J. Kolp, Ivoryton, both of Conn.

[73] Assignee: The Lee Company, Westbrook, Conn.

[21] Appl. No.: 167,977

[22] Filed: Mar. 14, 1988

[51] Int. Cl.⁴ .............................................. B01D 35/00
[52] U.S. Cl. .................................. 210/232; 210/541; 210/542; 248/94
[58] Field of Search ............... 210/232, 234, 249, 251, 210/352, 350, 351, 541, 542; 248/94; 267/60, 134, 135; 137/541, 542; 175/228; 166/255

[56] References Cited

U.S. PATENT DOCUMENTS

| | | | |
|---|---|---|---|
| 3,175,342 | 3/1965 | Balogh | 210/352 |
| 3,407,936 | 10/1968 | Balogh | 210/352 |
| 4,078,722 | 3/1978 | Luckenbill | 137/542 |
| 4,372,400 | 2/1983 | Beimgraben | 175/228 |
| 4,574,883 | 3/1986 | Carroll et al. | 166/255 |
| 4,614,661 | 9/1986 | White | 137/541 |
| 4,753,727 | 6/1988 | Lee et al. | 210/232 |

Primary Examiner—Frank Sever
Attorney, Agent, or Firm—Chilton, Alix & Van Kirk

[57] ABSTRACT

A self-retaining smooth bore insert employs a helical coil spring for retaining a fluid system component in a smooth bore. The spring comprises two connected helical coils. One coil is coiled around the component. The second coil has an engarged diameter which engages the wall of the smooth bore. An end portion of the second coil is engaged by an installation tool to contact the coil to permit installation.

16 Claims, 4 Drawing Sheets

SELF-RETAINING SMOOTH BORE INSERT

BACKGROUND OF THE INVENTION

The present invention relates generally to self-retaining smooth bore inserts. More particularly, the present invention relates generally to devices for securely mounting an in-line fluid system component within a smooth bore.

Small bore fluid components such as filters or pressure indicators are frequently required for zero-defect hydraulic control applications. There are numerous applications in the aerospace technologies wherein it is desirable to mount miniature components in small diameter smooth bores of fluid control systems. The dimensional constraints, e.g. bore diameters, typically on the order of 0.25 inch or less, and the environmental operational constraints impose demanding design parameters for the means whereby the fluid components or elements are mounted in the systems.

In U.S. patent application No. 846,961, filed on April 1, 1986 and entitled "Self-Retaining Smooth Bore Insert and Method of Installing Same" of Leighton Lee II and Robert J. Kolp, the inventors herein, a smooth bore insert comprises a self-retaining member which employs a helical spring. One end of the helical coil spring is connected in a fixed manner to the fluid system component. In a relaxed state, the coil spring has an outer diameter which is greater than the predetermined diameter o the smooth bore. The spring frictionally locks the insert within the bore. The ends of the coil spring are relatively rotatable to contract the coil spring slightly by rotation of one end of the spring in one angular direction in relation to the other as a result of frictional resistance between the coil spring and the smooth bore. A connector is threaded to the insert and connects with the helical coil spring. A threaded tool mates with the connector, and upon rotation of the tool, the diameter of the helical coil spring is sufficiently retracted to permit installation of the insert into the smooth bore. Upon counter-rotation of the tool, the helical spring is released to its relaxed state wherein it engages the surrounding wall of the smooth bore to thereby self-retain the insert in position.

SUMMARY OF THE INVENTION

Briefly stated, the invention in a preferred form is a new and improved self-retaining smooth bore insert which employs a self-retaining device comprising a spring having dual helical coil portions. One portion of the helical coil is closely received on the cylindrical shank of the fluid component and coiled thereabout. A second helical coil portion has an enlarged diameter which in a relaxed state is slightly greater than the predetermined diameter of the smooth bore. In one embodiment, the second helical coil terminates in a bend or hook-like catch. A tool comprising a shaft having a radially extending lug is engageably receivable in the catch.

In a second embodiment, the second coil spring terminates in a linear segment which extends generally diametrally relative to the second coil spring. A second installation tool having an open-ended cylindrical shape defines a pair of slots which are adapted to engage the end of the second coil spring for rotatable retraction thereof.

The insert is mounted in the smooth bore by rotating the tool in one angular direction to retract the coil spring. Upon inserting the insert at the proper depth in the smooth bore, the tool is rotated in the opposite angular direction thereby allowing the helical coil spring to assume its relaxed state for frictionally self-retaining the insert in the smooth bore.

An object of the present invention is to provide a new and improved self-retaining smooth bore insert for securely mounting a miniature fluid system component such as a pressure monitor within a drilled or reamed smooth bore.

Another object of the present invention is to provide a new and improved self-retaining smooth bore insert for precisely locating a miniature fluid system component within a smooth small diameter bore on the order of ¼ inch or less which insert will be self-retaining against a substantial force of up to 50 times the force of gravity or more.

Another object of the present invention is to provide a new and improved self-retaining smooth bore insert which is highly resistant to corrosion and is suitable for zero-defect aerospace application.

A yet further object of the invention is to provide a new and improved self-retaining smooth bore insert having a highly efficient and low cost construction.

Other objects and advantages of the invention will become apparent from the drawings and the specification.

DETAILED DESCRIPTION OF THE INVENTION

Figure 1:
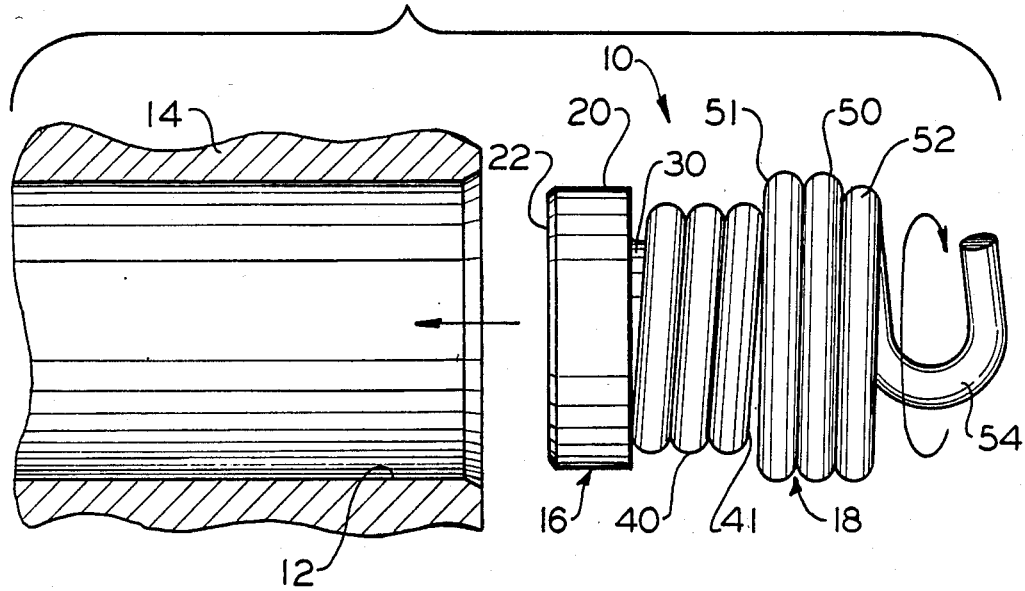
FIG. 1 is a side elevational view of a self-retaining smooth bore insert in accordance with the present invention and a fragmentary sectional view of a smooth bore in which the insert may be installed.

With reference to the drawings wherein like numerals represent like parts throughout the figures, a self-retaining, smooth bore insert in accordance with the present invention is generally designated by the numeral 10. The insert 10 is adapted for self-retaining installation within a smooth bore 12 of a conventional hydraulic fitting 14 as illustrated in FIG. 1. The insert 10 can be installed typically in a bore with a ±0.002 inch fit. The bore 12 may be formed during casting or drilled or reamed so as to provide a smooth wall. The insert 10 is especially adapted for use in connection with miniaturized fluid components. For example, in one application the smooth bore 12 has a generally uniform diameter of 0.1875 inches. The insert 10 generally comprises a fluid system component 16 and a retainer element 18. The fluid system component 16 may be any of numerous forms and functions. Fluid system component 16 as illustrated in the drawings is a maximum pressure indicator such as disclosed in U.S. Pat. No. 4,715,231, entitled "Maximum Pressure Indicator" and assigned to the assignee of the present invention. Pressure indicator 16 includes a head 20 having an outside diameter which is less than the diameter of the associated smooth bore 12. The head has a cavity (not illustrated). A disk 22 is bonded to the head. The disk is deformable into the cavity in accordance with pressure applied to the face of the disk. The maximum system pressure may be determined by measuring the amount of disk deformation. The pressure indicator 16 is illustrative of one of numerous forms of fluid system components for which the invention has application and should not be deemed a limitation of the invention herein.

Figure 2:
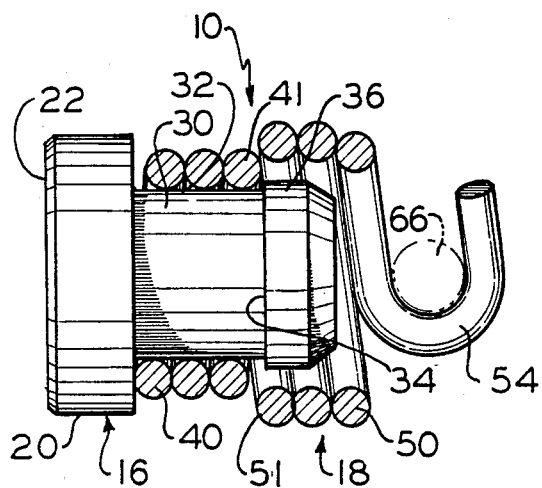
FIG. 2 is a side view, partly broken away, of the insert of FIG. 1.

With specific reference to FIG. 2, a mounting shank 30 extends integrally axially from head 20 in generally coaxial relationship therewith. Shank 30 has an exterior cylindrical surface 32 of generally uniform diameter. A circumferentially extending retaining flange 34 projects radially uniformly, slightly beyond the cylindrical surface 32 to form a peripheral cylindrical edge 36 of uniform diameter. In preferred form, the head 20, shank 30 and retaining flange 34 are integrally machined from Inconel alloy, stainless steel or other similar corrosion resistant materials.

The retainer element 18 is a spring member which comprises two integrally connected, left hand, helical coils 40 and 50. The retainer element is preferably formed from Inconel alloy, stainless steel or other similar corrosion resistant materials. The coils 40 and 50 ar close wound coils.

Helical coil 40 preferably comprises at least 2½ coil turns of generally uniform diameter (in a given spring state) and has an inside diameter in the relaxed state which is roughly commensurate with the outside diameter of cylindrical surface 32. Helical coil 40 is formed and longitudinally slipped over the retainer flange 34 until the coil seats on the cylindrical surface 32. A forward portion of the trailing turn 41 of the helical coil is retainably engaged by the retainer flange 34 when the coil assumes its relaxed seated position. The inside portions of helical coil 40 may lightly engage the cylindrical surface to yieldingly resist rotatable motion thereabout.

Figure 3:
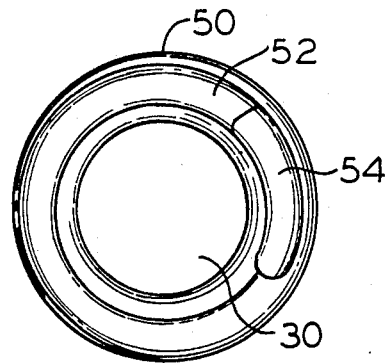
FIG. 3 is an end view of the insert of FIG. 1.

Helical coil 50 has an enlarged outside diameter which in the relaxed state is slightly greater than th diameter of the smooth bore 12. The inside diameter of the helical coil 50 is greater than the diameter of flange edge 36 and thus accommodates the peripheral retainer flange 34 which is centrally received interiorly of the coil. In preferred form, helical coil 50 consists of 2½ coil turns, although 3½ or 4½ or other numbers of coil turns may also be suitably employed. A portion of the trailing turn 52 of helical coil 50 has a reduced diameter in relation to the other turns of coil 50 as best illustrated in FIGS. 1 and 3. The trailing terminus of the helical coil 50 is formed by means of a compound bend into a generally U-shaped catch or drive hook 54. The body portion of drive hook 54 is shaped and oriented to be generally coaxial with the turns of coil 50 as illustrated in FIG. 3.

Figure 4:
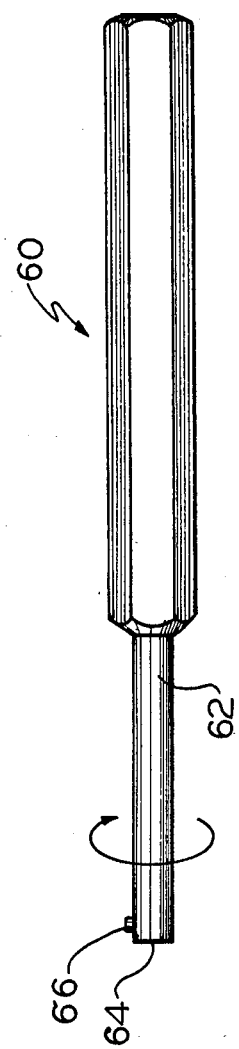
FIG. 4 is a side view of a tool employed for installing the insert of FIG. 1.

With reference to FIG. 4, an installation tool 60 for insert 10 includes a longitudinally extending shaft 62 which terminates at end 64. A radially projecting lug 66 extends from a side of the tool proximate the terminal end 64. The tool 60 is dimensioned and configured so that the end portion of the tool is axially insertable through the axial end of the helical coil 50 to a position wherein the lug 66 and the drive hook 5 generally align.

The lug may then be rotatably engageably captured by the drive hook 54 as schematically illustrated in FIG. 2.

The insert 10 is installed within the bore 12 by initially mounting the insert 10 onto the end portion of the installation tool 60. The terminal end 64 is inserted through the opening of helical coil 50. The lug 66 is engaged with the hook 5 of the helical spring. The mounted insert is inserted axially into the end of the bore 12. Because the outside diameter of the helical coil 50 is slightly greater than the diameter of the bore, a slight frictional resistance to insertion is encountered. While axially inserting the insert into the bore, the installation tool 60 is torqued in a clockwise direction of the arrow simultaneously with the axial insertion. In one application of the invention, 0.25 pounds of axial force is required and a 5 inch-ounce torque is applied to the tool. When the insert is inserted to the desired location within the bore, the installation tool 60 is rotated counterclockwise for disengaging the lug 66 from the catch or drive hook 54. The tool 60 is then disengaged from the insert. The insert is self-retained within the bore by the frictional engagement of the helical coil 50 against the wall of the smooth bore 12. The retainer element 18 also functions to self-locate the fluid component 16 in the installation bore.

It will be appreciated that during the installation process the leading end 51 of the helical coil spring 50 engage the end of the bore 12. The engagement of the leading end 51 of the coil with the bore contemporaneously with the application of the clockwise torque causes the helical coil 50 to contract sufficiently to allow the insert to slide relatively freely into the bore. Clockwise torque is accordingly continually applied to the coil via the installation tool 60 as the insert is axially displaced within the bore. At the desired location within the bore, the installation tool is rotatably disengaged from the helical coil 50 by rotating the tool counterclockwise and axially withdrawing the installation tool 60 from the bore. The counterclockwise tool rotation does not rotate the insert. The helical coil 50 will thus be allowed to assume a quasi-relaxed state wherein the coil 50 is expanded slightly to frictionally engage the wall of the smooth bore 12 to thereby firmly lock the insert in position. When the insert is locked in place within the bore, the insert is capable of withstanding a substantial axial force without being displaced from its fixed self-retained position within the bore.

The insert may be removed from the bore by simply reinserting the tool 60 into the bore through the end of the helical coil 50. The tool is then rotated in a clockwise direction to engage the catch or drive hook 54 on the helical spring. After the hook is rotatably engaged by the lug 66, the tool continues rotation in the clockwise direction simultaneously with the axial withdrawal of the insert from the bore to thereby efficiently effect removal of the insert.

The helical coil portions of the spring function to self-center and self-locate the fluid system component within the bore. The reduced helical coil 40 need not be rotatably fixed to the shank of the fluid component 16. The described insert represents a self-retaining smooth bore which has a relatively easy assembly since the spring retainer may essentially be snapped onto the fluid component (over the peripheral edge 36 of flange 34). Threaded retainer portions are not required, and the spring need not be fastened to the fluid component by threaded engagement or a side hole or by other means requiring extensive machining of the fluid component.

High corrosion resistant materials such as Inconel 625 alloy or stainless steel may be employed for the fluid system component 16 and the retainer spring 18.

EXAMPLE

In one embodiment of the invention, for a bore 12 having an inside diameter of approximately 0.1875 inch, the outside diameter of head 20 was approximately 0.18 inch, and the outside diameter of the cylindrical surface 32 of the shank was approximately 0.11 inch. The diameter of flange edge 36 was approximately 0.12 inches. The inside diameter of the helical coil 40 was 0.11 inch and the maximum outside diameter of helical coil 50 was approximately 0.195 inch. The inside diameter of the drive hook was approximately 0.050 inch. The trailing turn of the helical coil had a diameter of approximately 0.190 inch. Inconel 600 alloy was employed for the retainer spring. The insert was installed in the smooth bore 12 by an installation tool similar to tool 60. The insert 10 weighed approximately 0.6 grams and upon being installed in the installation bore 12 was capable of withstanding an axial force in excess of 8 lbs.

Figure 6:
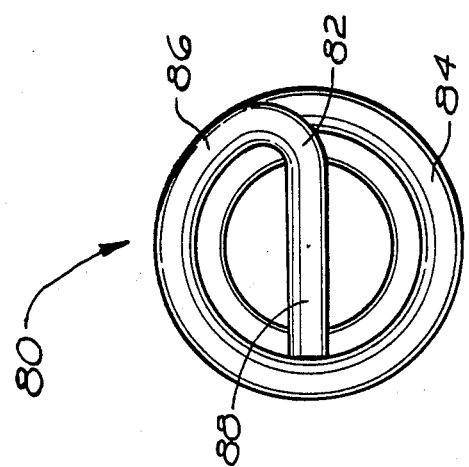
FIG. 6 is an end view of the element of FIG. 5.
Figure 5:
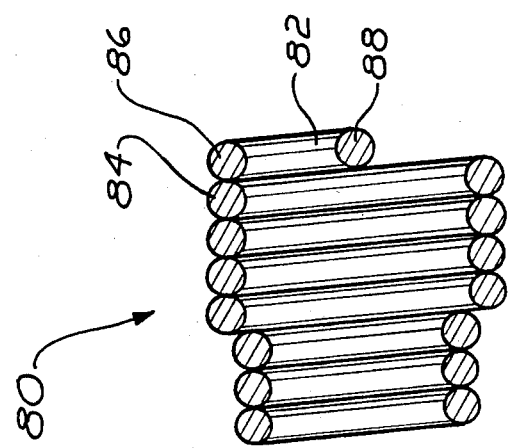
FIG. 5 is a side sectional view of an alternate embodiment of a retainer element which may be employed in a self-retaining insert in accordance with the present invention.

A second embodiment of a retainer element is generally designated by the numeral 80 in FIGS. 5 and 6. Retainer element 80 may be substituted for retainer element 18 and functions in substantially the same manner except for the modifications described herein. The principal difference between retainer element 80 and retainer element 18 resides in the trailing end portion 82. The coil turns of the second helical coil 84 including the trailing coil 86 are generally coaxial. The trailing portion of the spring terminates in a linear segment 88 which extends generally diametrally relative to the second helical coil (as best illustrated in FIG. 6). The retainer element 80 essentially allows for more spring turns for a given space compared to retainer element 18, and thus may achieve a higher retention capability, all other qualities being equal to that of retainer element 18.

Figure 7:
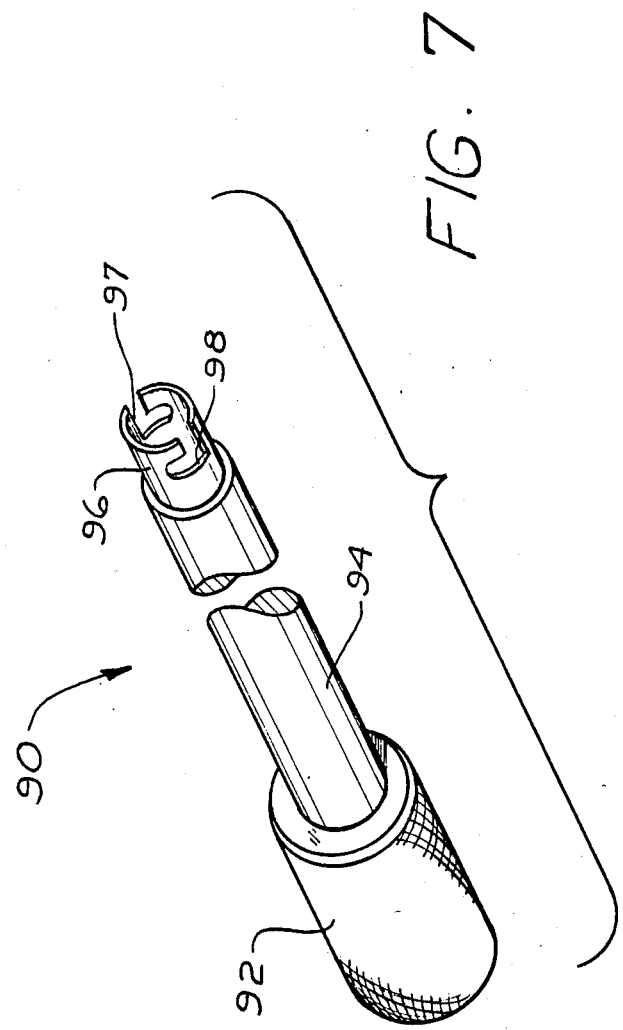
FIG. 7 is a perspective view, partly broken away, of an installation tool employed for installing an insert having the element of FIG. 5.

An installation tool 90, as illustrated in FIG. 7, includes a handle 92 disposed at one end of an axially extending shank 94. An open-ended cylindrical socket 96 axially projects from the shank end opposite the handle 92. A pair of generally L-shaped slots 97 and 98 are defined in the socket wall. The slots 97 and 98 cooperatively axially receive linear segment 88 and rotatably lock the segment 88 and retainer element 80 to the tool 90. Application of a torque to tool 90 is transferred to a rotatable force for contracting the second helical coil 84 in essentially the same manner as previously described for insert 10. Installation and removal of the self-retaining insert employing element 80 is also essentially the same as that previously described for insert 10.

It should be appreciated that the drive hook 54 and the linear segment 88 function to secure the insert to the installation tools 60 and 90, respectively, during the installation and removal of the insert. This latter feature is important because of the relatively small size of the insert. Retrieval of an accidentally dropped insert may prove quite difficult because of the small insert size and the nature of the systems in which the inserts are employed.

While preferred embodiments of the foregoing invention have been set forth for purposes of illustration, the foregoing description should not be deemed a limitation of the invention herein. Accordingly various modifications, adaptations and alternatives may occur to one skilled in the art without departing from the spirit and the scope of the present invention.

What is claimed is:

1. A miniature, self-retaining, fluid system component insert adapted to be installed in a smooth bore of predetermined diameter comprising:
   a fluid system component having a mounting surface; and retainer means for retaining said component in the smooth bore sufficient to provide self-retaining against a force having a magnitude at least equal to the weight of the insert, said retainer means comprising:
   a first helical coil spring coiled around said mounting surface and being retained thereon, and
   a second helical coil spring having a leading end and an axially spaced trailing end, said second coil spring connecting said first coil spring at said leading end and in a relaxed state having an outside diameter greater than said predetermined bore diameter to provide frictional resistance between the second coil spring and the bore to frictionally lock the insert within the bore, said second coil spring at the trailing end thereof being adapted for rotational engagement in one angular direction to contract the second coil spring as a result of frictional engagement between portions of the second coil spring and the smooth bore.

2. The self-retaining insert of claim 1 wherein the first coil spring comprises two and one half coil turns.

3. The self-retaining insert of claim 1 wherein the second coil spring has a reduced diameter adjacent the trailing end thereof and terminates at the trailing end in a hook-like catch.

4. The self-retaining insert of claim 1 wherein the first coil spring is retained on the mounting surface by means of a flange.

5. The self-retaining insert of claim 4 wherein the second coil spring has inside diametral dimensions which permit at least a portion of the second coil spring to encircle said flange.

6. The self-retaining insert of claim 3 further comprising tool means comprising a shaft having a lug for rotatably engaging said hook-like catch for diametral contraction of said second coil spring.

7. The self-retaining insert of claim 1 wherein the second coil spring comprises a generally diametrally extending linear segment adjacent the trailing end thereof.

8. The self-retaining insert of claim 7 further comprising tool means comprising an open-end cylindrical portion defining having a pair of slots for rotatably engaging said segment for diametral contraction of said second coil spring 9. The self-retaining insert of claim 1 wherein the mounting surface has a generally cylindrical shape and the first coil spring has an inside diameter substantially commensurate with the diameter of the mounting surface.

10. A miniature, self-retaining, fluid system component insert adapted to be installed in a smooth bore of predetermined diameter comprising:
   a fluid system component having a generally cylindrical axial shank and a radially protruding structure adjacent one end of said shank; and
   retainer means for retaining said component in the smooth bore sufficient to provide self-retaining against a force having a magnitude at least equal to the weight of the insert, said retainer means comprising:

a first helical coil spring coiled around said shank and having an inside diameter substantially commensurate with the diameter of said shank, said first coil spring being axially retained on said shank by said structure, and a second helical coil spring having a leading end and an axially spaced trailing end, said second coil spring connecting said first coil spring at said leading end and in a relaxed state having an outside diameter greater than said predetermined bore diameter to provide frictional resistance between the second coil spring and the bore to frictionally lock the insert within the bore, said second coil spring having engagement means at the trailing end thereof for rotational engagement in one angular direction to contract the second coil spring as a result of frictional engagement between portions of the second coil spring and the smooth bore.

11. The self-retaining insert of claim 10 wherein the retainer comprises a flange which circumferentially extends around said shank.

12. The self-retaining insert of claim 10 wherein the first and second helical coil springs each comprise two and one half coil turns.

13. The self-retaining insert of claim 10 further comprising tool means comprising a shaft and a lug means engageable with said engagement means for diametrally contracting the second coil spring upon application of a torque to said shaft.

14. The self-retaining insert of claim 10 wherein said engagement means comprises a linear segment extending generally diametrally relative to said second coil spring.

15. The self-retaining insert of claim 10 wherein said engagement means comprises a hook-like catch.

16. The self-retaining insert of claim 10 wherein said engagement means comprises a diametrically extending extension.

* * * * *